April 11, 1939.  J. M. WEYDELL  2,153,856
GEAR SET
Filed Oct. 26, 1936
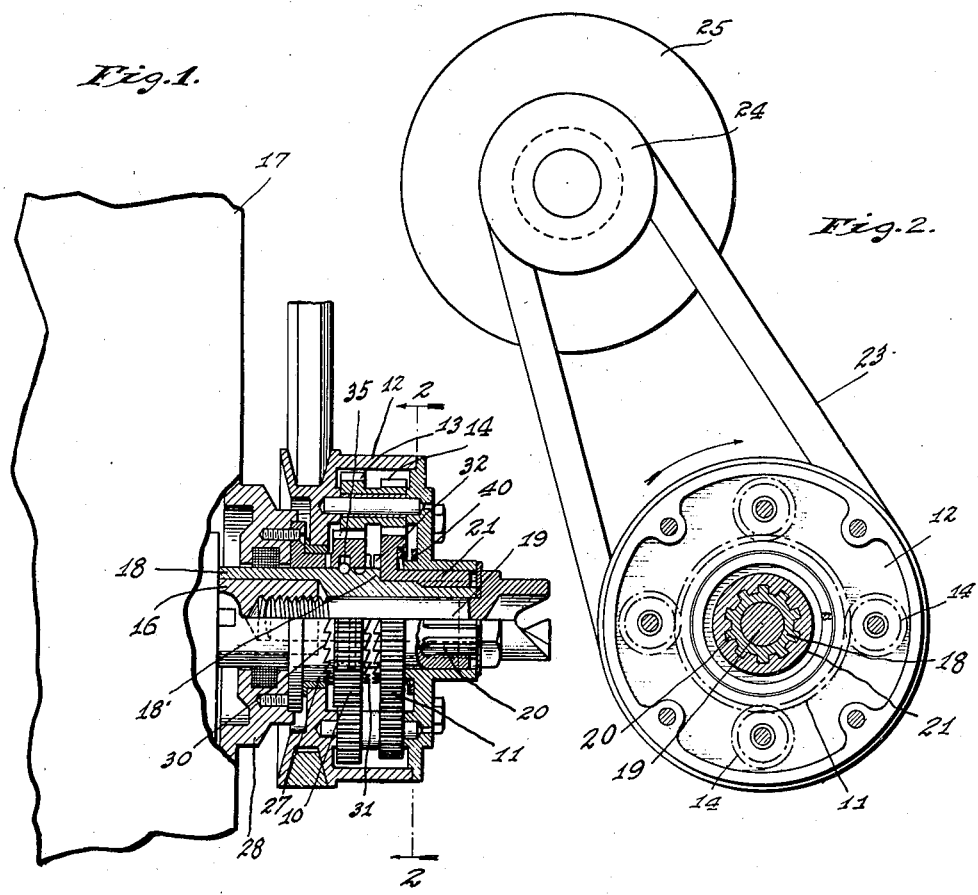
INVENTOR.
JARL M. WEYDELL,
BY
ATTORNEYS Patented Apr. 11, 1939

2,153,856

UNITED STATES PATENT OFFICE 2,153,856

GEAR SET

Jarl M. Weydell, Indianapolis, Ind., assignor of one-half to Edward E. Stout, Indianapolis, Ind.

Application October 26, 1936, Serial No. 107,503

4 Claims. (Cl. 74—6)

It is the object of my invention to produce a change-speed transmission mechanism gear-set adapted to interconnect two relatively rotatable members in such a way that the speed-ratio which the gear-set provides will depend upon which of such relatively rotatable members is the driving member and which the driven member. More specifically, it is my object to produce a planetary or epicyclic gear-set which may be used to connect an internal combustion engine with an electrical unit adapted to function either as a motor to crank the engine or as a generator to create an electric current when driven by the engine. A further object of my invention is to equip such a gear-set with provisions which will function automatically to provide a speed-reducing drive when the electrical unit is cranking the engine and a direct drive when the engine is driving the electrical unit.

In any epicyclic or planetary gear train, there are three relatively rotatable, coaxial elements one of which, when functioning as the driving element, will tend to rotate the other two in the same direction as that in which it rotates. Either of such other two elements, when acting as the driving element, will tend to rotate the third element in the reverse direction. In practicing my invention, I connect one of the two rotatable members between which the transmission is to act with that one of the three coaxial transmission elements which, when acting as the driving element, will tend to rotate the other two elements in the same direction; and I connect one of such other transmission-elements to the second rotatable member. In such an arrangement, the direction in which the third element of the transmission tends to rotate will depend on which of the two rotatable members is the driving member and which the driven member. To effect the desired automatic control of the speed-ratio which the transmission affords, I provide means operative in accordance with the direction in which the said third transmission element tends to rotate to connect said third element either to a stationary part or to one of the other transmission elements to effect a direct drive.

In the practical application of my invention specifically described in this application, I prefer to employ a planetary gear-set of the type comprising two coaxial, external sun gears and a planet-gear carrier coaxial with the sun gears and carrying one or more pairs of planet gears meshing with the sun gears. In such a transmission, the larger of the two sun gears is the element which, when functioning as the driving element, tends to drive the other two coaxial elements in the same direction. As I desire the speed-changing drive which the transmission provides to be a speed-reducing drive, I connect the planet-gear carrier to the electrical unit. In such an arrangement, the direction in which the smaller sun gear tends to rotate will depend upon whether the larger sun gear or planet-gear carrier is the driving element. To control the transmission in accordance with the direction in which the smaller sun gear tends to rotate, I provide that sun gear with two series of ratchet clutch-teeth one co-operating with a stationary part and the other with a corresponding series of teeth on the larger sun gear, and I so arrange these clutch-teeth that their ratchet action will tend to move the smaller sun gear into clutching engagement with the stationary part when the planet-gear carrier is the driving element and into clutching engagement with the larger sun gear when it is the driving element.

The accompanying drawing illustrates my invention as applied to interconnect an internal combustion engine and a motor-generator unit, Fig. 1 being a side elevation of one end of the engine with parts of the transmission broken away and Fig. 2 being a vertical section on the line 2—2 of Fig. 1 showing the connection of the transmission to the motor-generator unit.

The transmission for the gear-set illustrated in the drawing comprises two coaxial sun gears 10 and 11, the former being smaller than the latter, and a planet-gear carrier 12 in which are mounted one or more pairs of planet pinions 13 and 14. The two pinions 13 and 14 of each pair of planet pinions are rigidly interconnected and mesh respectively with the sun gears 10 and 11.

In use for the purpose indicated above, the gear-set just described is conveniently supported from one end of the crank shaft 16 of the engine 17. While the transmission may be mounted directly on the end of the crank shaft, I prefer to mount it upon an extension in the form of a sleeve 18 which is counterbored for the reception of the front end of the crank shaft 16, which is keyed thereto, and which may be held in place by a bolt 19 extending axially through the sleeve and into a screw-threaded recess in the crank shaft. The smaller sun gear 10 is rotatably mounted on the sleeve 18, while the larger sun gear 11 is mounted for rotation with the sleeve, as by means of splines 20. The planet-gear carrier 12 may be supported on the hub 21 of the gear 11 and is formed exteriorly to provide a pulley for the reception of a belt 23 connecting the carrier to the pulley 24 of the starter-generator unit 25.

Associated with the transmission is a stationary part, here shown as a collar 27 secured to the front face of a boss 28 on the engine crank-case. The collar 27 and the sun gear 10 are provided with interengageable ratchet clutch teeth 30, as indicated in Fig. 1. In addition to the clutch teeth engageable with the collar 27, the sun gear 10 is provided on the opposite side with a second series of ratchet clutch teeth 31 engageable with a corresponding series of similar teeth 32 on the adjacent side of the larger sun gear 11.

The smaller sun gear 10 is axially slidable on the sleeve 18 between a position in which it is associated with the collar 27 and a position in which it is associated with the other sun-gear 11. Some means, such as a snap-ring 35 carried in a groove in the bore of the sun gear 10 and cooperating with two axially spaced grooves on the sleeve 18, is desirably provided for tending to hold the sun gear in each limit of its axial movement on the sleeve 18 until it is definitely forced therefrom by the action of one or the other sets of ratchet teeth.

The sun gear 11 is shown in the drawing in the position it occupies when the pulley 24 is driving the belt 23, the direction of rotation being indicated by the arrow in Fig. 2. As the planet-gear carrier 12 rotates in a clockwise direction, the resistance of the crank-shaft 16 to rotation tends to cause the smaller sun gear 10 to rotate in a counterclockwise direction. The ratchet-teeth 30 are so inclined as to prevent rotation of the sun gear in a counterclockwise direction; and, as a result, the sun gear 11, and with it the crank-shaft, is driven in a clockwise direction at a reduced speed, the extent of the reduction depending upon the relative sizes of the various gears.

When the engine 17 begins to operate under its own power, the sun gear 11 becomes the driving element of the transmission; and, as previously indicated, it tends to rotate both the smaller sun gear 10 and the planet-gear carrier 12 in the same, or clockwise direction. Rotation of the sun gear 10 in a clockwise direction causes the ratchet-teeth 30 to force it to the right from the position shown in Fig. 1, thus bringing the clutch teeth 31 into engagement with the clutch teeth 32 on the sun gear 11. Since the sun gear 11 is larger than the sun gear 10, the latter tends to rotate at a more rapid rate than does the sun gear 11, or to rotate relatively to the gear 11 in the same direction as that in which the gear 11 is itself rotating. The interengaging clutch teeth 31—32 are therefore shaped to prevent clockwise rotation of the gear 10 relative to the gear 11. When the teeth 30—31 are engaged, the two sun gears 10 and 11 are compelled to rotate at the same rate and the gear-set therefore provides a direct drive between the crank-shaft 16 and the planet-carrier.

Should the sun gear 10 be engaged with the sun gear 11 when the starter-generator 25 begins to operate as a motor, the tendency of the sun gear 10 to rotate in a counterclockwise direction will cause the ratchet teeth 31—32 to force it to the left into clutching engagement with the stationary collar 27.

It may be noted that the slope of each of the two sets of ratchet-teeth 30 and 31—32 is determined by the direction in which the driving and driven elements rotate and by whether the speed-changing drive is to be a speed-reducing or a speed-increasing drive. As shown, the speed-changing drive is a speed-reducing drive and is obtained when the planet-carrier is the driving element; but by reversing the direction in which the clutch teeth slope (or by reversing the direction of rotation) a direct drive would be obtained with the planet carrier 12 as the driving element and a speed-increasing drive would be provided when the sun gear 11 was the driving element.

To prevent any harmful consequences should complete movement of the gear 10 to either of its limit positions be prevented by end-to-end engagement of the clutch teeth, one of the two elements 11 and 27 may be capable of yieldingly opposed sliding movement on the sleeve 18. In the drawing, the sun gear 11 is shown as so arranged, it being held in normal position against a shoulder 18' by a spring 40. Should the teeth 31—32 engage each other in abutting rather than meshing relation when ratchet action of the teeth 31 is forcing the sun gear 10 to the right, the spring 40 will yield momentarily to permit relative rotation of the two sun gears until the clutch teeth are brought into meshing relationship.

The yieldable mounting of the sun gear 11 on the sleeve 18 also acts to prevent any damage should complete leftward movement of the sun gear 10 be prevented by end-to-end engagement of the teeth 30; for any resistance to leftward movement of the gear 10 would be reflected as rightward pressure imposed on the gear 11 through the teeth 31—32, and the gear 11 could yield against the force of the spring 40 under the influence of that rightward pressure.

The resistance with which the snap-ring 35 opposes movement of the small sun gear 10 from either of its limit positions should be proportioned to the torque which the gear-set transmits, so that such resistance will never be so great as to prevent the intended axial movement of the sun gear 10.

While I have shown a gear-set of particular form as employed to interconnect an internal combustion engine with a starter-generator, it is to be understood that my invention is not limited to such an application nor to the particular form of gear-set shown.

I claim as my invention:

1. In combination with an internal combustion engine, a starter-generator, and means operatively interconnecting said engine and said starter-generator, said means including a planetary gear-set having two relatively rotatable, coaxial sun gears of different sizes and a planet-gear carrier carrying pinions operatively interconnecting said sun-gears, said planet-carrier and the larger of said two sun gears being operatively connected to said starter-generator and said engine respectively, a stationary part, and means responsive to the direction in which the smaller sun gear tends to rotate for clutching it either to said stationary part or to said larger sun gear.

2. In combination with an internal combustion engine, a starter-generator, and means operatively interconnecting said engine and said starter-generator, said means including a planetary gear-set having two relatively rotatable, coaxial sun gears of different sizes and a planet-gear carrier carrying pinions operatively interconnecting said sun gears, said planet-carrier and the larger of said two sun gears being operatively connected to said starter-generator and said engine respectively, a stationary part, and means responsive to the direction in which the smaller sun gear tends to rotate for clutching it either to said stationary part or one of the other elements of said gear-set.

3. In combination with an internal combustion engine, a starter-generator, and means operatively interconnecting said engine and said starter-generator, said means including a planetary gear-set having two relatively rotatable, coaxial sun gears of different sizes and a planet-gear carrier carrying pinions operatively interconnecting said sun gears, said planet-carrier and the larger of said two sun gears being operatively connected to said starter-generator and said engine respectively, a stationary part, and means responsive to the direction in which the smaller sun gear tends to rotate for clutching it to said stationary part when said starter-generator is driving said engine and for clutching it to another element of said gear-set when said engine is driving said starter-generator.

4. In combination with an internal combustion engine, a starter-generator, and means operatively interconnecting said engine and said starter-generator, said means including a planetary gear-set having two relatively rotatable, coaxial sun gears of different sizes and a planet-gear carrier carrying pinions operatively interconnecting said sun gears, said planet-carrier and the larger of said two sun gears being operatively connected to said starter-generator and said engine respectively, a stationary part, said stationary part and said smaller sun gear being provided with a set of cooperating ratchet clutch teeth, said two sun gears being provided with a second set of co-operating ratchet clutch teeth, and said smaller sun gear being mounted for axial sliding movement between positions in which said two sets of clutch teeth are respectively engaged, said first set of clutch teeth being inclined to move said smaller sun gear out of association with said stationary part and into clutching engagement with the larger sun gear when the engine is driving the generator, and said second set of clutch teeth being inclined to move said smaller sun gear out of association with the larger sun gear and into clutching engagement with said stationary part when said starter-generator is driving the engine.

JARL M. WEYDELL.